July 9, 1957
I. NAXON
2,798,931
ELECTRIC FRYING PANS
Filed May 23, 1955
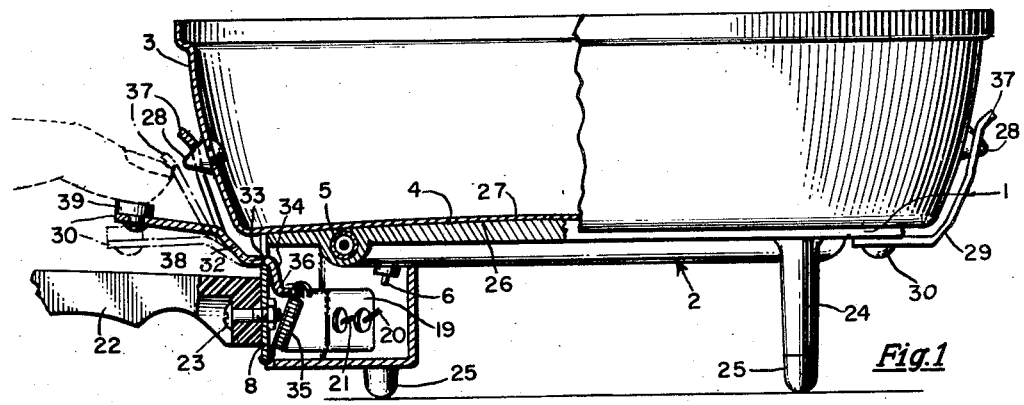
Fig. 1
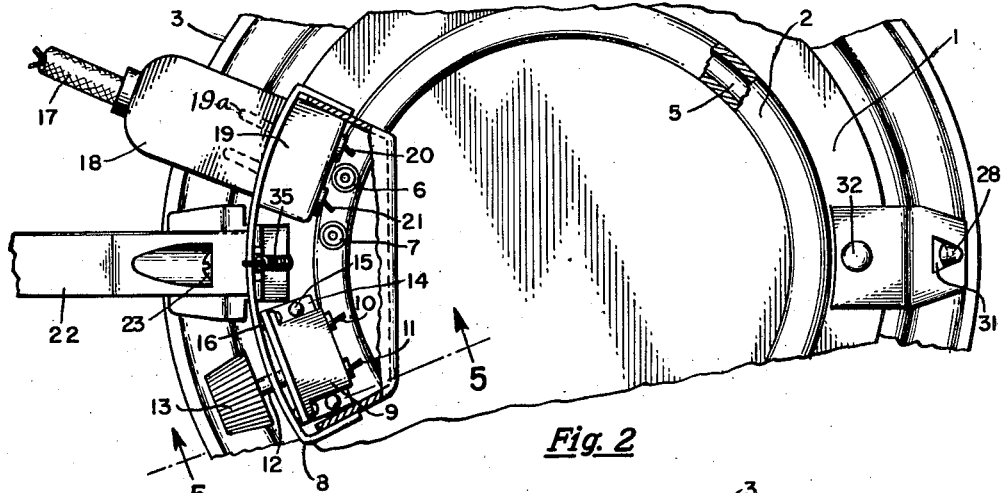
Fig. 2
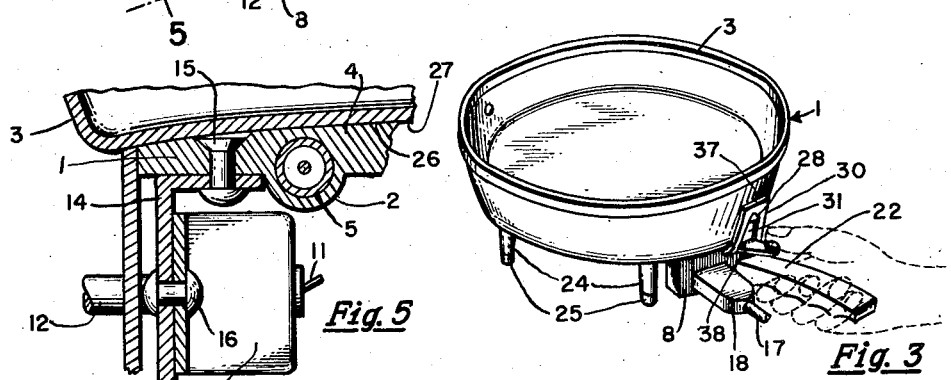
Fig. 5
Fig. 3
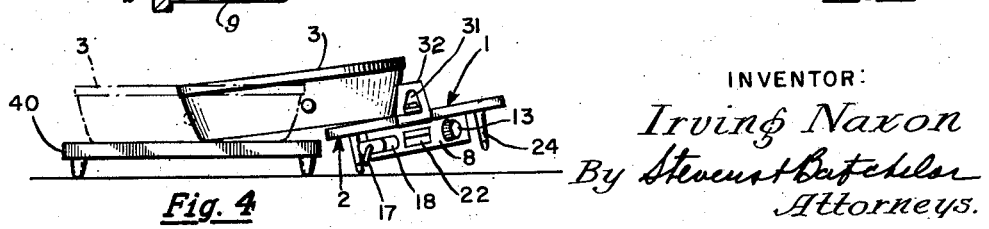
Fig. 4
INVENTOR:
Irving Naxon
By Stevens & Batchelor
Attorneys.

United States Patent Office 2,798,931
Patented July 9, 1957

2,798,931

ELECTRIC FRYING PANS

Irving Naxon, Chicago, Ill.

Application May 23, 1955, Serial No. 510,139

7 Claims. (Cl. 219—43)

My invention relates to electric frying pans, and more particularly to the type which is self-heating. Pans of this nature usually comprise a vessel formed with a heating unit in its bottom, the vessel carrying the usual handle, and the heating unit presenting the conventional prongs for the application of a current cord socket. While pans of this type are efficient for cooking purposes, they present a problem of sanitation and safety when they are to be cleaned. This usually involves the application of a wet dishcloth or the immersion of the pan in suds. In either case, it may be difficult, beacuse of the heating unit involved, to do an efficient or sanitary cleaning job with the dishcloth or suds. Also, water from the dishcloth or suds is apt to penetrate into the chambers or cavities in which electrical connections or contacts occur, with the possibility of contaminating them or causing an electrical short circuit when the pan is used again for cooking. In other words, the electrical construction of the frying pan is not compatible with the keeping of the same in a sanitary and safe condition, imposing a special task on the housewife to exercise unusual care in cleaning or washing the frying pan, and also presenting the possibility that at any time the electrical mechanism of the pan may get out of order or cause a safety hazard.

In view of the above conditions, it is one object of the present invention to provide a self-heating electric frying pan which carries the heating facility only when the pan is used for cooking purposes.

A further object is to design a self-heating frying pan whose heating facility is one part and the cooking vessel another or separate part.

Another object is to provide a self-heating frying pan in which the cooking vessel is an independent part which is instantly separable and removable from the heating facility for cleaning in the manner of any frying pan or cooking vessel.

An additional object is to design the heating facility in a manner to present a heating top upon which the cooking vessel may be locked in place to keep it in intimate thermal contact with the heating top during the cooking operation and in case the frying pan is tilted or agitated.

A still further object is to employ a plurality of retaining devices for the cooking vessel to maintain the same in the intimate thermal contact previously referred to, one such retaining device being located in the region of a thermostat in order to transmit the thermal condition of the cooking vessel back to the thermostat and attain a more accurate thermal relation between the thermostat and the food being cooked.

An important object is to construct the novel frying pan with a manual control which procures the instant release of the cooking vessel from the heating facility for separation from such facility.

With the above objects in view, a better understanding of the invention may be had by reference to the accompanying drawing, in which—

Fig. 1 is a side elevation of the frying pan, partly in section, with its handle partially broken away;

Fig. 2 is a fragmental bottom view of the showing in Fig. 1;

Fig. 3 is a perspective view of the pan on a smaller scale and illustrating the manner of handling and controlling it;

Fig. 4 is a similar view showing the manner in which the pan is manipulated to separate the cooking vessel from the pan, such as for serving, washing or other cleaning without necessitating the handling of the cooking vessel; and Fig. 5 is an enlarged section taken on the line 5—5 of Fig. 2.

In accordance with the foregoing, specific reference to the drawing indicates the top of the heating facility at 1, the same having a circular enlargement 2 on the underside; and 3 represents the side wall of the cooking vessel. As indicated at 4, the top 1 is formed with a slightly domed or convex surface designed for the placement of the cooking vessel thereon; and the enlargement 2 contains an electrical heating element 5, the latter having terminals 6 and 7.

The terminals 6 and 7 of the heating unit 5 open into a casing 8 which is designed to hold the parts of an electrical heating unit; and 9 shows a thermostat mounted in the casing for the control of such heating unit. The thermostat extends with terminals 10 and 11, and its control is accomplished by means of a shaft 12 carrying a knob 13 projected from the front of the casing 8. Also, the thermostat is carried by a bracket 14 secured by rivets 15 to the top 1 of the heating facility, while a downward wing of the bracket receives rivets 16 for the attachment of the thermostat to such wing.

Electric current to operate the frying pan is carried in a cord 17 terminating with the familiar type of connecting socket 18. The casing 8 carries a base 19 on the inside formed with the usual prongs 19a engageable by the socket 18. Such base has terminals 20 and 21, and suitable wiring occurs between these and the terminals 6, 7, 10 and 11 in order to complete the electrical connections for the frying pan, but such wiring has been omitted in the drawing for purposes of clarity.

The pan receives a handle 22 of insulation material applied to the casing 8, a bolt 23 serving to secure the handle to the casing with the aid of a nut on the inside of the latter, as shown in Fig. 1; and the manner of holding the handle is indicated by dotted lines in Fig. 3.

The heating facility 1 is in the form of a stand equipped with four feet 24 which are equally spaced; and the same carry tips 25 of insulation material at the bottom. The bottom of the cooking vessel is indicated at 26, and 27 shows that such bottom is slightly domed or convexed to fit the form of the heating top 1.

Means are provided for holding the bottom 26 of the cooking vessel down firmly on the heating top 1. Thus, the wall 3 of the cooking vessel carries a pair of external studs 28 at diametrically opposite locations, the studs being cone-shaped and rounded at the points. A spring clip 29 is attached by a rivet 30 at a point opposite one of the studs 28, the same passing in part through an opening 31 in the upper portion of the clip. A similar clip 32 occurs opposite the other stud 28 and applies to the same in a manner similar to the clip 29. However, the clip 32 is pivoted at 33 in an opening of the casing 8, extending with a downbend 34 in the direction of a spring 35 located in the casing. One end of this spring is hooked in the bottom of the casing, while the other end is engaged by a stem 36 of the bend 34 in a manner to draw upon the clip 32 with a clockwise rotative influence. The clips 29 and 32 have outward curls 37 at the upper ends, while the clip 32 has a downwardly deflected extension 38 carrying a button 39 of insulation material over its outer end.

As may be assumed from Fig. 1, the downward application of the cooking vessel 3 to the heating top 1 will cause the studs 28 to bear outwardly on the curls 37 of the spring clips 29 and 32 with the effect of snapping the studs into the openings of the clips. The cooking vessel is now seated on the heating top, but the inward pressure of the clips 29 and 32 will cause them to climb on the studs as if these were inclined cams, such climbing action bearing down on the studs to firmly seat the cooking vessel on the heating top.

When the heat is turned on, a tendency usually arises to warp or deflect the bottom of a cooking vessel. This action could also take place in the heating top 1, particularly if it were a stamping made considerably thinner than shown in Fig. 1, with the likelihood that the warpage of the contacting surfaces may be in opposite directions, leaving spaces between them. Therefore, the deforming of the cooking vessel bottom and the heating top in the same direction would tend to increase the convexity in the matched parts as they become hotter and nest them more closely in each other. This condition eliminates the possibility of spaces between the contacting parts and makes for thorough thermal intimacy therebetween, resulting in a highly efficient transmission of heat from the heating top to the cooking vessel. It is further noted that the clip 32 is located in lateral proximity to the thermostat 9. Since the pull on the cooking vessel may be assumed as being greater in the region of the clip than away from it, it follows that the thermal contact of the cooking vessel with the heating top will be increased in the region of the thermostat, adding to the efficiency of the thermal control of the heating top in respect to the cooking vessel.

It is noted from Figs. 1 and 3 that the clip 32 is located directly above the handle 22. This makes the button 39 handy for the application of the thumb, as indicated by dotted lines in the figures referred to, so that it may bear down on the clip extension 38. This is done when the cooking period has ended and the cooking vessel is to be removed from the pan. Dot-and-dash lines in Fig. 1 show how the clip 32 departs from the corresponding stud 28 when the button 39 has been pressed down as stated, releasing the cooking vessel from engagement with the heating top. The pan now may be tilted sidewise by means of the handle 22, as indicated in Fig. 4, in which event the cooking vessel 3 will slide off the heating top onto a trivet or other handy support 40, by means of which the cooking vessel may be carried to the table for serving purposes, and later to the sink for cleaning purposes. Since button 39 is spaced away from the handle 22 it will not be inadvertently operated while the assembly is in use; and also being spaced from the heating top and pan it will not become hot to the touch. There is also advantage in having the latching means and the current control 13 independent of the handle 22 so that the latter can be removed if desired so as to economize space when the assembly is to be shipped or stored. Then too, should the handle work loose in service, electrical trouble won't result as would likely be the case if the current supply and control involved the handle 22.

It will now be apparent that the novel frying pan has a number of advantageous features. First, the separate cooking vessel is readily placeable on the heating top and becomes automatically locked by the clips 29 and 32 with a pressing thermal engagement with the heating top. Further, the convexed construction of the cooking vessel bottom and the heating top make for a high degree of heat transmission. Further, it is not necessary to use the hands or a pot holder to remove the cooking vessel from the pan, the simple pressure on the button 39 and lateral tilt of the handle 22 facilitating the separation of the cooking vessel from the heating unit by its own sliding action onto a nearby support. Further, the cooking vessel is of common, simple construction with nothing added but the studs 28, making it easy to handle, scour or otherwise clean either by means of a dishcloth or immersing the cooking vessel in suds. Further, the heating or electrical portion of the pan remains entirely away from any cleaning or wetting zone so as to be free from contamination, damage or a short circuit. Finally, the improved frying pan is constructed along lines of compactness and simplicity, so that it can be handled and operated by the average person.

While I have described the invention along specific lines, various minor changes or refinements may be made therein without departing from its principle, and I reserve the right to employ all such changes and refinements as may come within the scope and spirit of the appended claims.

I claim:

1. An electric frying pan comprising a base unit presenting a heating top of thermal conducting material, an independent cooking vessel designed for placement on said top with an intimate thermal relation between the bottom of the cooking vessel and said top, means for locking the cooking vessel to the latter in order to maintain said relation, said locking means comprising mechanical elements carried by the heating top, other elements carried by the vessel and adapted to tension and interlock with the first-named elements on said placement, said first-named elements comprising clips formed with perforations, and said other elements comprising cam-like studs seating in the perforations and depressed by the tensioning of said first-named elements to intensify said relation.

2. An electric frying pan comprising a base unit presenting a heating top of thermal conducting material, an independent cooking vessel designed for placement on said top with an intimate thermal relation between the bottom of the cooking vessel and said top, means for locking the cooking vessel to the latter in order to maintain said relation, said locking means comprising clips engageable with the cooking vessel on said placement and tensioned by the same, a handle carried by said heating top, and an extension of one of said clips to a point proximate to the handle, such extension comprising a finger control effective to withdraw the related clip and release the cooking vessel.

3. In an electrically heated cooking vessel assembly or the like comprising separable pan and base members providing contiguously engageable bottom and top surface portions, respectively, there being a heating unit in said base member which latter provides a heating top; interengaging securing means carried by said respective pan and base members, said securing means incorporating portions operable to draw said pan and base surface portions into intimate engagement whereby to render the assembly functionally integral when in use and to provide effective transference of heat to the pan bottom, said securing means including a movable member, a laterally projecting handle rigidly carried by and projecting laterally from one of said pan and base members and by means of which the secured together assembly is transported or manipulated during a cooking operation, and actuating means operatively connected to said movable securing means member and located conveniently adjacent said handle for operation by a finger of a hand which is gripping said handle.

4. The structure of claim 3, and said handle and the actuating means for said movable securing means member being carried by said base member.

5. The structure of claim 3, and a depending and rigid heating unit terminal-supporting wall provided by said base member adjacent at least one edge area of the latter, and said handle and the movable securing means member supported by said wall.

6. An electric frying pan comprising a base unit presenting a heating top of thermal conducting material, an independent cooking vessel designed for placement on said top with an intimate thermal relation between the bottom of the cooking vessel and said top, means for locking the cooking vessel to the latter in order to maintain said relation, said locking means comprising clips engageable with the cooking vessel on said placement and tensioned by the same, a handle carried by one of said heating top and cooking vessel members, and an extension of one of said clips to a point proximate to the handle, such extension comprising a finger control effective to withdraw the related clip and release the cooking vessel.

7. An electric frying pan comprising a base unit presenting a heating top of thermal conducting material, an independent cooking vessel designed for placement on said top with an intimate thermal relation between the bottom of the cooking vessel and said top, means for locking the cooking vessel to the latter in order to maintain said relation, said locking means comprising clips engageable with the cooking vessel on said placement and tensioned by the same, a handle carried by one of said heating top and cooking vessel members, and an extension of one of said clips, such extension comprising a finger control effective to withdraw the related clip and release the cooking vessel.

References Cited in the file of this patent

UNITED STATES PATENTS

| | | |
|---|---|---|
| 968,441 | Ayer | Aug. 23, 1910 |
| 983,292 | Kohn | Feb. 7, 1911 |
| 1,034,130 | Madsen | July 30, 1912 |
| 1,120,884 | Ayer | Dec. 15, 1914 |
| 1,436,657 | Ingersoll | Nov. 28, 1922 |
| 1,570,052 | Erwin | Jan. 19, 1926 |
| 1,843,455 | McGowen | Feb. 2, 1932 |
| 2,620,089 | Loghem | Dec. 2, 1952 |
| 2,682,602 | Huck | June 29, 1954 |

FOREIGN PATENTS

| | | |
|---|---|---|
| 17,453 | Great Britain | July 30, 1913 |
| 106,032 | Australia | Dec. 15, 1938 |
| 245,614 | Switzerland | Aug. 1, 1947 |
| 631,408 | Germany | June 19, 1926 |